United States Patent [19]

Blemberg

[11] Patent Number: 5,284,687

[45] Date of Patent: * Feb. 8, 1994

[54] COEXTRUSION APPARATUS, METHODS, AND RELATED FILMS AND PACKAGES

[75] Inventor: Robert J. Blemberg, Appleton, Wis.

[73] Assignee: American National Can Company, Chicago, Ill.

[*] Notice: The portion of the term of this patent subsequent to Aug. 15, 2009 has been disclaimed.

[21] Appl. No.: 746,130

[22] Filed: Aug. 15, 1991

Related U.S. Application Data

[63] Continuation-in-part of Ser. No. 458,487, Dec. 28, 1989, Pat. No. 5,236,642, and a continuation-in-part of Ser. No. 458,488, Dec. 28, 1989, Pat. No. 5,143,677, and a continuation-in-part of Ser. No. 687,765, Apr. 18, 1991, Pat. No. 5,190,711, and a continuation-in-part of Ser. No. 140,096, Dec. 31, 1987, Pat. No. 4,944,972.

[51] Int. Cl.⁵ .................. B32B 1/08; B32B 27/30
[52] U.S. Cl. .................. 428/35.2; 428/35.4; 428/172; 428/220; 428/221; 428/518
[58] Field of Search .................. 428/35.2, 35.4, 156, 428/172, 500, 515, 516, 518, 520, 220, 98; 264/173; 156/244.13

[56] References Cited

U.S. PATENT DOCUMENTS

| | | | |
|---|---|---|---|
| 3,427,099 | 11/1969 | Lee et al. | 18/13 |
| 3,558,330 | 1/1971 | Widige et al. | 99/174 |
| 4,042,661 | 8/1977 | Cook | 264/173 |
| 4,044,187 | 8/1977 | Kremkau | 428/212 |
| 4,265,693 | 5/1981 | Nishimoto | 156/218 |
| 4,379,117 | 4/1983 | Baird, Jr. et al. | 428/518 |
| 4,478,670 | 10/1984 | Heyse et al. | 156/380.1 |
| 4,643,927 | 2/1987 | Luecke et al. | 264/173 |
| 4,714,638 | 12/1987 | Lustig et al. | 428/34.9 |
| 4,723,902 | 2/1988 | Erickson | 264/173 |
| 4,755,402 | 7/1988 | Oberle | 428/34.9 |
| 4,804,510 | 2/1989 | Luecke et al. | 264/169 |
| 4,842,791 | 6/1989 | Gould et al. | 264/171 |

*Primary Examiner*—Ellis P. Robinson
*Assistant Examiner*—Rena L. Dye
*Attorney, Agent, or Firm*—Mary J. Schnurr

[57] ABSTRACT

Apparatus and method for fabricating films, especially films containing vinylidene chloride copolymer, wherein the process is susceptible of continued operation over an extended period of time greater than a few days. The process typically can operate for at least 2 weeks between shut downs for cleaning the die. The apparatus comprises a coextrusion feedblock 20 in combination with an annular extrusion die 10 having a crosshead mandrel 11, and means for conveying the exit stream 24 from the feedblock to the die. The particular apparatus combination especially reduces the rate of carbon buildup in the extrusion apparatus during extrusion of VDC-copolymer, such that the extrusion process can be operated for a longer time between shutdowns for cleaning and maintenance of the die. The invention further includes novel tubular films 32 made with the apparatus and methods of the invention, and packages made from the films. In general, the method of the invention produces tubular films having more layers than the annular extrusion die has annular orifices.

8 Claims, 4 Drawing Sheets

COEXTRUSTION APPARATUS, METHODS, AND RELATED FILMS AND PACKAGES

RELATED APPLICATIONS

This application is a continuation-in-part of application Ser. Nos. 458,487, now U.S. Pat. No. 5,236,642, and 458,488, now U.S. Pat. No. 5,143,677, both filed Dec. 28, 1989, and a continuation-in-part of application Ser. No. 687,765, now U.S. Pat. No. 5,190,711, filed Apr. 18, 1991, and a continuation-in-part of application Ser. No. 140,096 filed Dec. 31, 1987 now U.S. Pat. No. 4,944,972; all of which are hereby incorporated herein by reference in their entireties.

FIELD OF THE INVENTION

This invention relates to novel methods for coextruding multiple layer polymeric films. It also relates to the apparatus used in the novel methods, to the novel films made therewith, and to packages made from those films.

BACKGROUND OF THE INVENTION

Referring especially to the problem addressed in inventing the invention herein, vinylidene chloride copolymers (VDC) are preferred for their barrier properties to transmission of moisture vapor and oxygen. The extrusion of VDC copolymers to form tubular films has conventionally been practiced with annular dies having crosshead type mandrels. Spiral type mandrels are not generally used with VDC copolymers because the dwell time is desirably minimized when extruding VDC, and low shear areas are desirably eliminated, to prevent, or delay, the degradation of the VDC copolymers.

It is commonly known that the extrusion of VDC copolymers is accompanied by a plurality of problems relating to the sensitivity of VDC copolymer to the combination of high temperature, and time for which the copolymer must be maintained at that elevated temperature, in the extrusion process.

One problem is that the VDC copolymer sometimes gets into the fit area above the conventionally used crosshead groove, degrades, and washes back out as carbon. The wash out typically is most evident along the weld line of the extruded film. A second problem is that carbon may also form in all areas where the VDC copolymer contacts the metal in the die. With respect to this second problem, the build-up of carbon eventually becomes generally thick enough over a large enough portion of the die surfaces to affect the distribution of the VDC copolymer around the circumference of the die. In addition, bits of the formed carbon may wash out of the die in the extrudate, contaminating the film being fabricated.

These and other sources of problems with the extrusion of the VDC copolymer indicate, and conventional practice verifies, that commercial operation of the VDC copolymer extrusion process can function for only a limited time, such as a few days, between shutdowns for cleaning of the die. Further, this sensitivity of VDC copolymer to the time during which it is held at elevated temperature has resulted in the development of only limited-size commercial dies for fabrication of tubular films, with typical die sizes being less than 25 cm. in circumference. Of course, the larger the die circumference, the greater the amount of time that the polymer spends at the elevated temperature as it travels around the circumference of the crosshead mandrel in the process of being fabricated into a film. Thus, processes for fabrication of films greater than 25 cm. in diameter, and containing the VDC copolymer, are generally carried out in a slot die of the cast extrusion type; and such processes are not available in tubular form, or in a form derived from a tubularly extruded film. While recent developments indicate that die circumferences up to 79.8 cm. have been developed, as in U.S. Pat. No. 4,379,117, Baird et al, such dies at present have limited applicability and are not in wide-spread use.

With the circumference of the die opening thus being limited to no more than 80 cm. in known use, and it is usually no more than 40 cm., the typical blown up diameter of a tubularly extruded film will generally not exceed twice that size, namely about 150–160 cm., usually no more than about 70–75 cm. Those dimensions related to unoriented films as they are fabricated in blown film processes or tubular water quench processes. Where the tube is subsequently molecularly oriented, the tube diameter may be as great as about 300–320 cm., but is usually no more than about 150–160 cm.

It is an object of this invention to provide a method for fabricating tubular multiple layer films containing a layer of VDC copolymer which overcomes the above problems.

It is further an object to overcome especially the problem of the VDC copolymer getting into the fit area above the crosshead groove.

It is still another object to overcome, in large part, the formation of carbon from VDC copolymer in the die.

Still another object is to reduce the fraction of the internal surface area of the die which is exposed to the VDC copolymer.

It is another object of the invention to provide apparatus compatible with the novel methods.

It is another object to provide novel films made by the methods and apparatus of the invention, and packages made with those films.

SUMMARY OF THE INVENTION

Certain of the objects are obtained in apparatus for fabricating a plurality of streams of molten polymer into a multiple layer structure in the shape of a tube. The apparatus includes a coextrusion feedblock which has means for receiving a plurality of in-feed streams of molten polymer, and means for combining the plurality of in-feed streams into a multiple layer exit stream, wherein the exit stream comprises at least three layers and wherein each of the three layers extends to an outer surface of the exit stream. The apparatus further comprises an annular extrusion die having a crosshead type mandrel, and means for conveying the multiple layer exit stream from the feedblock to the crosshead type mandrel. The die forms the multiple layer exit stream into the referred-to multiple layer structure in the shape of a tube, the multiple layer structure having the same number of layers as the exit stream.

The crosshead type die mandrel preferably has an annular groove. The die also preferably includes an adapting zone for changing the direction of flow of the exit stream in the die before the exit stream reaches the groove in the mandrel.

Using the invention, the circumference of the mandrel may be greater than 80 cm.

In some of the preferred embodiments of the invention, the die has means for joining an additional layer to the outer surface, or the inner surface, of the 3 layers generally illustrated as comprising the tube. In some embodiments, the die includes means for joining additional layers to both the inner surface and the outer surface of the 3 layer structure.

The invention importantly includes methods of fabricating a plurality of in-feed streams of molten polymer into a multiple layer structure in the shape of the tube. The method generally comprises feeding the in-feed streams through a coextrusion feedblock where the feedblock receives the in-feed streams and combines them into a multiple layer exit stream. The exit stream preferably comprises 3 layers, although it may comprise only two layers in certain embodiments. The preferred 3 layers include a first interior layer disposed between the second and third layers, the one interior layer extending to opposing outer surfaces of the exit stream. The multiple layer exit stream is conveyed from the feedblock to a crosshead type annular mandrel in an annular extrusion die. The exit stream is forced through the die, whereby the die forms the exit stream into the multiple layer structure, in the shape of the tube.

Preferably the process includes conveying the exit stream through a direction-changing adapting zone in the die, and conveying the exit stream from the adapting zone to the mandrel. In the process of traversing the adapting zone, the exit stream is changed from a first direction to a second direction in the die. The die includes an annular channel for flow of the polymer between the groove around the top of the crosshead and an annular external opening in the die. The annular channel extends in a third direction from the groove to the external opening. The second direction of flow of the exit stream and the third direction of flow between the groove to the external opening are closer to alignment with each other than are the first direction of flow of the exit stream and the third direction of flow between the groove and the external opening. In some cases, the second and third directions may be the same.

The advantages of the invention are most readily observed when the method includes selecting a composition for the first layer comprising at least 25% by weight VDC copolymer. The invention is even more readily appreciated, and its value recognized, where the composition, including at least 25% VDC copolymer in the first layer is forced through a die having a circumference of the annular cross-head mandrel greater than 80 cm.

In preferred embodiments of the invention, the method includes extruding an additional layer through the die and joining it to the outer surface, or the inner surface, of the plurality of layers which are forced through the crosshead mandrel and out of the die at the external opening. A second additional layer is sometimes also extruded, so that both the inner and outer surfaces of the tubularly shaped plurality of layers are covered with an additional layer of material.

Another aspect of the invention is the multiple layer tubular film formed by the apparatus and the methods disclosed herein. The film has a first layer having a pair of opposing surfaces, and a second, and optionally a third layer on respective ones of the opposing surfaces. The tubular film comprises a weld line extending sequentially through the second, first, and, as applies, third layers in a continuous path at an angle greater then 45 degrees, usually approaching 90 degrees, to the surface of the first layer. That single weld line extends in an uninterrupted path through all the layers in a generally singular direction.

Considering the second layer as the outer layer in a tube having the 3 layers in the structure, a fourth layer is preferably included wherein the second layer is between the first layer and the fourth layer. Considering the fourth layer as having a second pair of opposing surfaces, the fourth layer is devoid of any weld line which is both disposed at an angle greater than 45 degrees to either of its second pair of surfaces and located within 2 cm., preferably 1 cm., of the weld line which extends through the second, first, and third layers.

In those embodiments which experience greatest benefits from the technical value of this invention, the first layer comprises at least 25% by weight VDC copolymer, and both the second and third layers are essentially free from VDC copolymer. The second and third layers, of course, comprise polymeric compositions compatible with coextrusion with VDC copolymer.

The films of the invention can readily be made into packages.

DETAILED DESCRIPTION

Preferred embodiments of the invention include the use of VDC copolymer in at least one layer. VDC copolymers suitable for use in those preferred embodiments are prepared utilizing such comonomers as methyl, ethyl, isobutyl, butyl, octyl, and 2-ethylhexyl acrylates and methacrylates; phenyl methacrylate; cyclohexyl methacrylate, p-cyclohexylphenyl methacrylate, chloroethyl methacrylate, 2-nitro-2-methyl-propyl methacrlate, and the corresponding esters of acrylic acid; methyl alpha-chloroacrylate, octyl alpha-chloroacrylate, methyl isopropenyl ketone, acrylonitrile, methacrylonitrile, methyl vinyl ketone, vinyl chloroacetate, vinyl bromide, styrene, vinyl naphthalene, ethyl vinyl ether, N-vinyl phthalimide, N-vinyl succinimide, N- vinyl carbazole, isopropenyl acetate, acrylamide, methacrylamide or monoalkyl substitution products thereof, phenyl vinhyl ketone, diethyl fumarate, diethyl maleate, methylene diethyl malonate, dichlorovinylidene fluoride, dimethyl itaconate, diethyl itaconate, dibutyl itaconate, vinyl pyridine, maleic anhydride, and allyl glycidyl ether. Preferred comonomers are acrylonitrile, methyl acrylate, and vinyl chloride.

The tubular extrusion of VDC copolymers has traditionally been performed using a crosshead type mandrel. Spiral type mandrels are preferred for other types of polymers. But they are generally not used with VDC copolymer because the dwell time of the VDC copolymer in the die must be minimized, and low shear areas are also minimized, in order to prevent (and particularly to delay) the generation and accumulation of degraded components of the VDC copolymer in the extrusion apparatus, and especially in the extrusion die. Spiral type mandrels are not well suited to minimizing the dwell time and the low shear areas.

Figure 1:
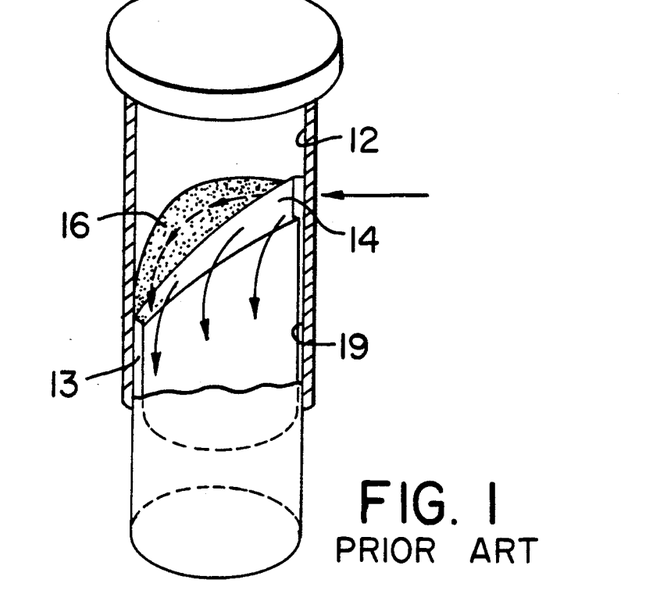
FIG. 1 shows a typical conventional crosshead mandrel of the prior art and indicates the typical leakage of polymer into the fitment area above the crosshead groove.

Various crosshead mandrel designs are available for use in extrusion processing of VDC copolymer. (A conventional crosshead type mandrel is illustrated in FIG. 1.) They typically suffer from one or more of a plurality of problems addressed in this invention.

First, the VDC copolymers tend to get into the fitment area 12 above the crosshead groove 14, degrade, and wash back out as carbon into the groove 14, and into channel 13, especially along the weld line of the film. The stippled area 16 above crosshead groove 14 in FIG. 1 indicates generally the area of flow of the polymer which unintentionally leaks into the fitment area. The fitment area 12 is generally defined herein as the area above groove 14 and between mandrel 11 and the outer containing wall 19. The dashed arrows through stippled area 16 indicate generally the typical direction of leakage of the polymer in the fitment area. The solid arrows show the primary direction of flow of polymer through the die. The problem of leakage into the fitment area can be addressed by providing close tolerances between the outside of mandrel 11 and the inside of the containing wall 19. Alternatively, mandrel 11 and the outer containing wall 19 may be cooperatively tapered to provide a tighter fit. A shrink fitting arrangement can also be used. Both the taper fit and shrink fit techniques are, however, susceptible to accelerated wear and subsequent failure.

Another problem is that carbon also generally forms in all areas where the VDC copolymer contacts metal in the die. The carbon eventually becomes thick enough to affect the distribution of the polymer around the die, as well as affecting the flow rate and the associated back pressure at the extruder. The build-up of carbon is usually experienced as a progressive function related to the time during which the die is in use. The die generally must be shut down, disassembled, and cleaned after a running period of only a few days, typically 7-10 days.

The problems discussed above have generally been associated with the contact between the VDC copolymer and the die metal. The above problems have been attenuated in conventional practice, for cast extruded film and sheet formed from that film, by completely encapsulating the VDC copolymer with another material (typically ethylene vinyl acetate or ethylene methyl acrylate). After the VDC copolymer has been encapsulated in the enclosing polymer (for example EVA), the encapsulated combination is then fed to a conventional cast extrusion die, such as a T-die or a coat hanger die, which forms the extruded stream, through a long slender slot, into a flat sheet of film, which is typically cast onto a metal roll for cooling.

An hypothetical problem in this type of film fabrication is that the edges of the film, being totally encapsulated, do not contain any VDC copolymer. If these edge portions of the film were anticipated for being used, the lack of VDC copolymer in the edge portions would be a very real problem. However, since edge portions of the film are removed by conventional edge trimming in a cast extrusion process, these areas of the film are typically not used and thus the hypothetical problem is eliminated in the normal processing.

The inventor herein, being familiar with the use of the recited total encapsulation process in fabricating VDC copolymer films using a cast extrusion process, considered adaptation of total encapsulation for use in fabricating tubular films. But such total encapsulation of the VDC copolymer before entering an annular die would result in an area of the film, extending the full length of the film, along the crosshead weld line of the film, which would be devoid of the VDC copolymer. Since VDC copolymer is generally used because of its excellent barrier properties, either barrier to oxygen permeation or barrier to water vapor permeation, such a gap in the protection, particularly for a tubularly shaped package, is unacceptable. While such a process could be used with a trimming away of the area which is devoid of the VDC copolymer and a rejoining of the edges by means of a seam or a joint, such a process would be expensive, would necessarily open the tube, and would be disadvantageous as compared to other extrusion processes desired for forming a tube. Total encapsulation would also preclude conventional die oscillation for the purpose of concept provides for a significant advantage in the length of the processing run in that the frequency of the shut down of the process for cleaning of the die is greatly reduced.

Thus the inventor searched diligently for a method of extrusion processing VDC copolymer through an annular die to form a tubular product without typical association of the rapid build up of carbon in the die.

This build up of carbon in the die is well recognized in the industry. It is known that the tubularly extruded film must be watched carefully in order to detect the black particles of carbon contained in the film as it is extruded from the die when the die is in the latter stages of a processing cycle. When the amount of carbon contained in the extrudate exceeds the desired acceptable amount, the process is shut down for cleaning of the die.

Figure 3:
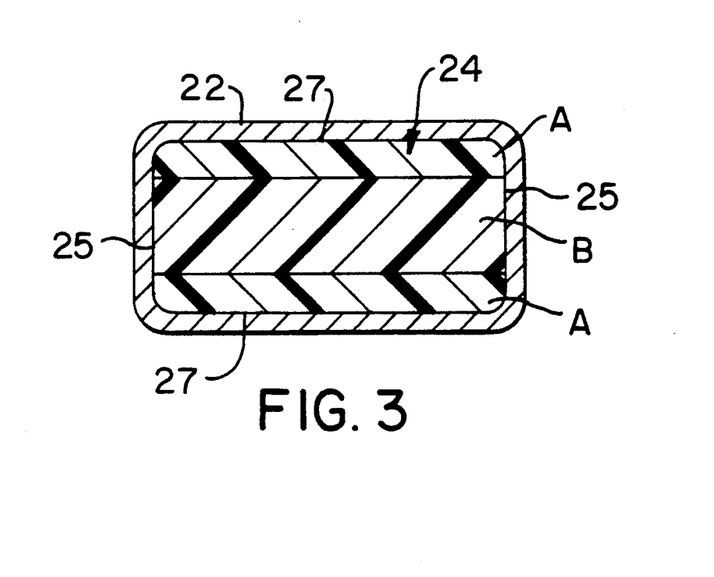
FIG. 3 shows a cross section of the exit stream in the conveying means as taken at 3—3 of FIG. 2.

It is known to combine a plurality of polymers in a convention "non-vinylidene chloride copolymer" feedblock to sandwich a first layer "B" between 2 layers of another material "A" and feed this combination into a T-style, or coat hanger style, die for forming a flat sheet of film, such as in the conventional cast extrusion process. In such a conventional feedblock, all of the layers A/B/A extend to the opposing outer surfaces of the exit stream. A cross section of the polymer structure which serves as the exit stream of such a feedblock is seen in FIG. 3. While such a structure is advantageous for use in cast extrusion of films which do not contain the VDC copolymer, it is not known to find use, in cast extrusion processes, with those films which do contain the VDC copolymer, because of the contact between the VDC copolymer and the surfaces of the die into which the exit stream is fed from the feedblock. Such a process would be less desirable than the process which uses the total encapsulation process as earlier described above. Thus the use of such feedblocks has been limited to those processes associated with a sheet type extrusion, such as cast extrusion, and within the context, to those film structures which do not use VDC copolymers.

In preferred embodiments of this invention, an inner layer of a VDC copolymer-containing composition is sandwiched between two outer layers of non-VDC copolymer materials, in a coextrusion feedblock which is typical of that used for forming non-tubular structures which do not contain VDC copolymer. The sandwich is fed into a crosshead type mandrel where it is fabricated into a tubular film. In more broadly conceived embodiments of the invention, the inner layer need not contain VDC copolymer. These embodiments find their primary advantage in that the equipment combination described herein can be used to fabricate films having more layers than the tubular die has annular openings, irrespective of whether the film being fabricated contains VDC copolymer. If the film does contain VDC copolymer, then the advantages specifically related to that combination are also obtained, in addition.

Figure 2:
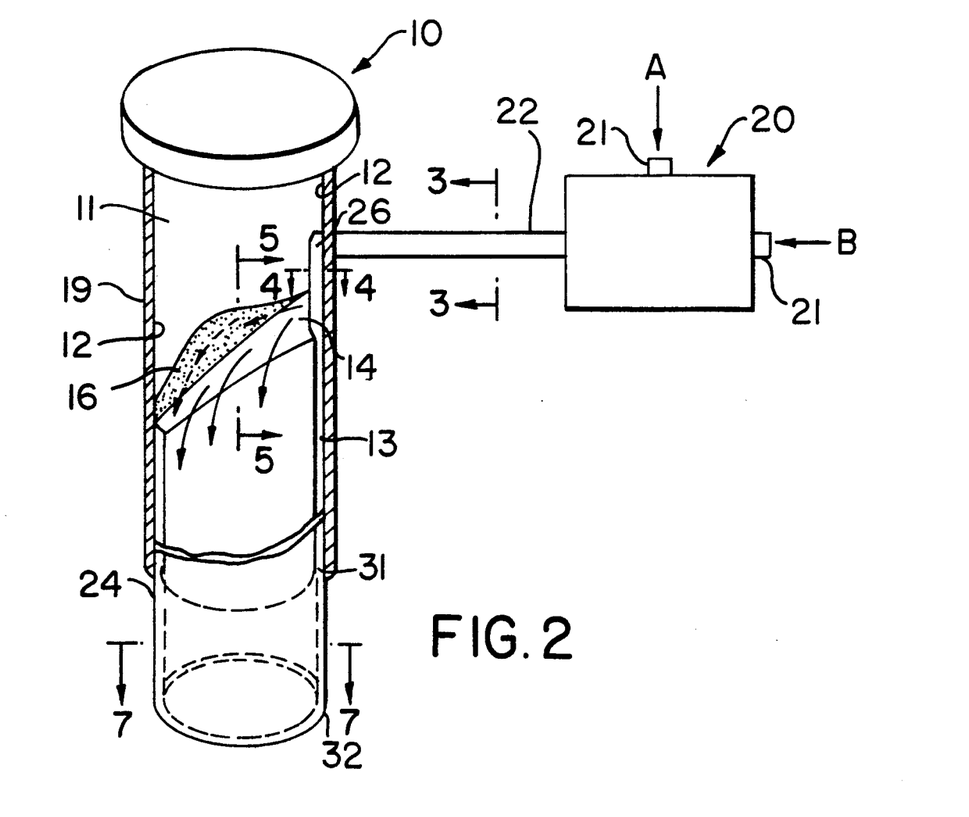
FIG. 2 shows a general layout of a portion of the apparatus typically used in this invention, including a coextrusion feedblock, parts of a die assembly (shown enlarged) having a crosshead type mandrel with an adapting zone, and means for conveying the polymer from the feed block to the die.

Referring now to FIG. 2, and representing the apparatus of the invention, block 20 represents a typical non-VDC copolymer coextrusion feedblock, well known in the art. A conduit 22, such as a rectangular pipe, extends between feedblock 20 and annular die 10, which includes crosshead mandrel 11. For sake of clarity, the die components shown include mandrel 11 and containing wall 19. Other die components, not shown, are conventional, or are readily adapted to accommodate the modifications to the die 10 which are disclosed herein for mandrel 11 and containing wall 19.

Feed streams A and B represent in-feed streams of the molten polymers A and B into the feedblock 20, which are received by the feedblock 20 at orifices 21. The feedblock 20 may, of course, receive more than 2 streams, and combine them into the respective layers. It is further acceptable that layers A on either side of layer B, as seen at 24 in FIG. 3, may have different compositions, each from the other.

Polymers A and B are combined into a multiple layer structure in feedblock 20, and the exit stream is conveyed by conduit 22 to die 10, where it is conveyed to crosshead mandrel 11. FIG. 3 shows the exit stream 24 in cross section in the conduit, disclosing its overall configuration. As seen in FIG. 3, layer B is sandwiched between the two outer, and preferably thinner, layers A. It is also seen in FIG. 3 that the interior layer B extends to opposing outer surfaces 25 of the exit stream 24. The outer layers A also extend to the opposing outer surfaces of the exit stream, as well as providing the upper and lower surfaces 27 which are in contact with the conduit 22.

Since the primary purpose of the outer layers A in the preferred embodiments of the invention is to reduce the area of contact between VDC copolymer, as in inner layer B and the interior surfaces of the die, layers A need be only thick enough to prevent contact between the VDC copolymer and the respective adjacent die surfaces. Thus layers A in the extruded film 32 may be as thin as 0.025 mm. thick, preferably at least 0.05 mm. Layers A may, of course, be thicker, to the attainment of other properties or functions. Layers A may, advantageously, be used as adhesive layers between layer B and adjoining inner and/or outer layers which may be combined with the exit stream 24 in die 10. Overall, the combined thicknesses of the two layers A in the A/B/A structure of film 32 is usually between 2% and 80%, preferably between 5% and 50%, most preferably between 5% and 30%, of the thickness of the A/B/A structure. The percentage may be lower than 2% when thick structures are being fabricated, for example greater than 0.250 mm. thick overall.

In some embodiments, the composition of layer B does not necessarily include VDC copolymer, in which case one of the layers A may be omitted; and in any event layer B may be quite thin, such as an adhesive layer which may be as thin as 0.003 mm. In such embodiments, the invention may be thought of as a means for extruding a multiple layer tubular film through an annular die having fewer annular layer openings for extruding the extrudate than there are layers in the film. For example, using the invention, and a three layer feedback, a 3-layer tubular film may be fabricated in, and extruded from, a single layer annular die, as illustrated in FIGS. 3-7. It is seen that, irrespective of the composition of layer B, the die, including crosshead mandrel 11, forms the multiple layer exit stream 24 into a film 32 having the same number of layers as the exit stream.

Referring especially now to FIG. 2, mandrel 11, includes an adapting zone 26 between the location where stream 24 enters mandrell 11 and the crosshead groove 14. Adapting zone 26 causes the stream 24 to change directions between the location where it enters mandrel 11 and the location where it enters the crosshead groove 14. As seen in FIG. 2, the flow of the exit stream 24 changes from a first direction as it approaches mandrell 11 to a second direction in the adapting zone 26, and is further adapted and changes directions again, especially through the use of channel 13, whereby the exit stream is fabricated into a film and conveyed from the channel 13 to the external annular opening 31 in the die in a third definable direction generally depicted by the solid arrows projecting downwardly from groove 14. The second and third directions of flow of the polymer in the exemplary A/B/A structure are, in many cases, closer to alignment with each other than are the first and third directions of flow. It is entirely acceptable that the second and third directions may be the same. And in some embodiments, they are. Most of the polymer does, of course, flow circumferentially around the die, as in groove 14, between its flowings in the second and third directions.

Figure 4:
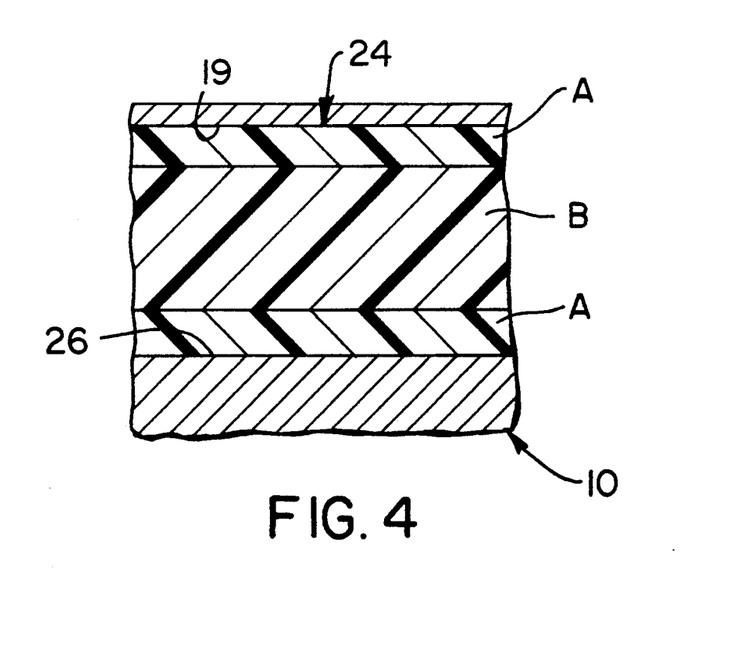
FIG. 4 shows a cross section of the exit stream taken at 4—4 of FIG. 2, as it is passing through the adapting zone of the invention.

The first change in direction, from the first direction to the second direction, is illustrated in the cross sections of the 3-layer polymer stream as depicted in FIGS. 3 and 4, and with relation to the location of the cross sections 3—3 and 4—4 in FIG. 2. Indeed it is seen from comparing FIGS. 3 and 4 that the cross sections are identical, with the only changes being the direction of flow of the stream at the locus where the cross section is shown. The cross-section may, of course, be different, in that the cross-section at 4—4 of FIG. 2 may represent a wider and thinner cross-section for beginning the formation of the rectangular exit stream into the thinner polymer stream required for forcing the polymer through the film-forming channel 13.

Figure 5:
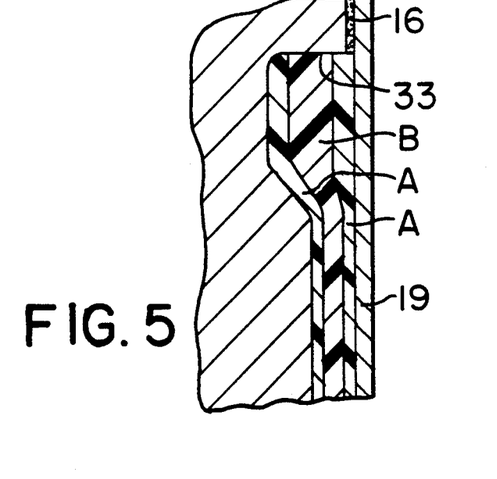
FIG. 5 shows a cross section of the 3 layer polymer composite in the crosshead groove and in the area of the annular die channel downstream from, and adjacent, the groove, as taken at 5—5 of FIG. 2.

As the multiple layer polymer stream flows through crosshead groove 14, and thence downwardly through the channel 13 formed between mandrel 11 and outer container wall 19, the A/B/A structure is thinned and distributed over the entire circumference of the mandrel below crosshead groove 14. The cross section at 5—5 in FIG. 2 is shown in detail in FIG. 5, along with an accompanying illustration of the relationship of the layers to the surfaces of the die parts; and especially groove 14 and the fitment area 12. As seen in FIG. 5, the layer B is essentially encapsulated between the 2 "A" layers such that there is minimal contact between the layer B and the die surfaces. Indeed, contact between layer B and the die in the illustrated embodiment is indicated only at the top 33 of crosshead groove 14. It is further noted that the material of layer A on the edge of the stream 24 is the primary material which is susceptible in this process, of leaking into the fitment area 12, and especially the stippled area 16, as seen in FIGS. 2 and 5.

Applicant contemplates that mechanical modifications to the die, especially to mandrel 11 and containing wall 19, may be practiced, toward the goal of reducing or eliminating polymer leakage into fitment area 12. The general direction of flow of the polymer leakage in fitment area 12 is depicted by the dashed arrows in stippled area 16 of FIG. 2. And applicant recognizes that such improvements in die design may be successful in reducing or eliminating such leakage in newly-fabricated dies. However, applicant contemplates that the effectiveness of such measures will be transitory, and that, even those dies which do not exhibit leakage when new, will eventually experience such leakage as the dies wear with extended use. When the leakage does occur, the attendant VDC copolymer degradation results if the polymer leaking into the fitment area is VDC copolymer. If, however, the VDC copolymer covering principles of this invention are being used, the polymer leaking into the fitment area 12 is that of a layer "A" whose composition has been chosen such that it is functionally free from VDC copolymer, whereby degradation of VDC copolymer is not a problem. In such case, the polymer leakage into fitment area 12 is of minimal consequence in that the materials contemplated for use in layers "A" are those which do not degrade significantly during the extrusion process. Thus the practice of the invention makes the process of extruding VDC copolymer, using the covering layers "A", more tolerant of polymer leakage into the fitment area, where the composition of layer "A" does not functionally incorporate the temperature sensitive VDC copolymer problem. As a result, tolerances in the die specifications may be somewhat relaxed, with attendant reduction in die cost. And since moderate polymer leakage in the fitment area, which may be associated with die wear, is not especially detrimental to the extrusion process in this invention, die life may be extended beyond the previously normal wear which would have made the die unserviceable (absent the practice of the invention) due to fitment leakage resulting from die wear, and the associated carbon particles in the extruded film.

So the hardware and process improvements of the invention provide a resulting process combination which is more tolerant of leakage into the fitment area in addition to sharply reducing the surface area of contact between VDC copolymer and the die surfaces. This is just one of the benefits of the invention. Others are described elsewhere in this teaching.

Having thus described the operation of the tubular die in combination with the non-VDC copolymer coextrusion feed-block, which feedblock was previously used to feed a T-die or a coat hanger die for cast extrusion of flat sheet film, it is seen that the use of such a combination of equipments is advantageous for adaptation to a coextrusion process including a VDC copolymer layer. The non-VDC copolymer layer A encloses most (i.e. greater than 75%, especially greater than 90%) of the surfaces of VDC copolymer layer B, such that the surface area of contact between the VDC copolymer and the respective surface of the die is usually extremely limited. With the surface area of contact so limited, the problem associated with extended contact between the VDC copolymer and major surface areas of the die is thereby attenuated, such that the extrusion processing of VDC copolymer in annular dies is facilitated and made possible for extended periods of time.

Another problem associated with tubular extrusion of VDC copolymer, and directly related to its time-related sensitivity to the high temperature required for extrusion processing it, is that the size of tubular dies has conventionally been limited in order to limit the length of the die path, and thus the time of exposure of VDC copolymer of the elevated temperature. Thus the conventional tubular extrusion processing of VDC copolymers has been limited to dies having a circumference of no more than 80 cm., typically no more than 25 cm. Using the apparatus and methods of the invention, this limitation of the time-temperature relationship of the VDC copolymer, and its associated degradation of polymer with the production of carbon particles, has been attenuated. It is now possible to use tubular dies of sizes which are more conventionally associated with non-VDC copolymer extrusion processes. Such dies typically run greater than (or at least) 80 cm. in circumference, e.g., at least 100 cm. circumference, at least 140 cm. circumference, at least 200 cm. in circumference, greater than 215 cm in circumference, and even up to 250 cm. in circumference, and in some cases greater, such as up to 350 cm. or more. Tubular films produced therefrom can accordingly have diameters of 80-350 cm. or greater, e.g., at least 80 cm., at least 100 cm., at least 140 cm., greater than 215 cm., and even up to 250 cm., or 350 cm., or greater, i.e., tubular films of this invention can have a diameter any where in the range of 80-350 cm or greater than 350 cm.; and, can have diameters in any range therebetween. Typical diameters can be at least 200 cm., greater than 215 cm., between 215 and 250 cm., between 215 and 350 cm., and, between 250 and 350 cm.

However, even die circumferences in the range of 50-60 cm. are indeed an improvement over the typical commercially practiced art, which, it is believed, is usually limited to about 40 cm., more or less. Die circumferences in the range of 90 cm., yes, 125-150 cm, and even up to the maximum circumference now practiced in the art will be generally susceptible to conventional development with respect to their adaptation to VDC copolymer extrusion in light of the instant disclosure. While larger sizes are contemplated as being possible for use without necessarily degrading the VDC copolymer by virtue of the high temperature and the residence time in the die, to the point where using such equipment would be unacceptable, other limitations on the die size enter into play when these larger size dies are considered. Such issues related with those larger sizes, and their adaptations, to the extent they are not related to the time-temperature sensitivity of VDC copolymer, form no part of this invention.

Figure 6:
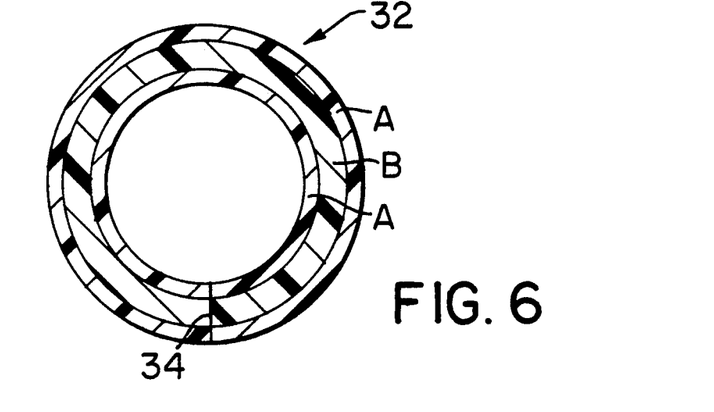
FIG. 6 shows a cross section of a typical tubularly shaped film of the invention, taken at 6—6 of FIG. 2, and made with method and apparatus of the invention.
Figure 8:
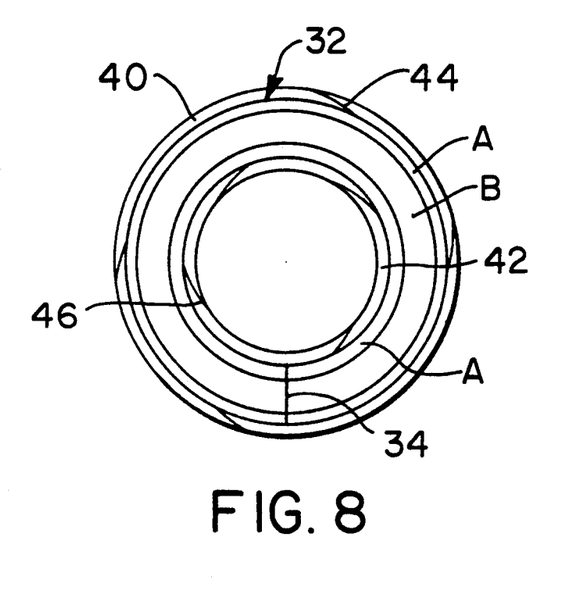
FIG. 8 shows a typical 3 layer film of the invention having fourth and fifth layers coextruded therewith to form a 5 layer film.

FIGS. 6 and 8 represent, in exaggerated thicknesses with respect to their diameters, tubular films 32 representative of films made using this invention. Film 32 comprises a central layer B enclosed on both sides by inner and outer layers A. Layers A and B in FIGS. 6 and 8 correspond to layers A and B in cross-section 24 in FIGS. 3 and 4. The cross-section of the film in FIGS. 6 and 8, is, of course, thinner than the cross-section of the stream 24 in the conduit 22 and the adapting zone 26 of the mandrel.

Figure 7:
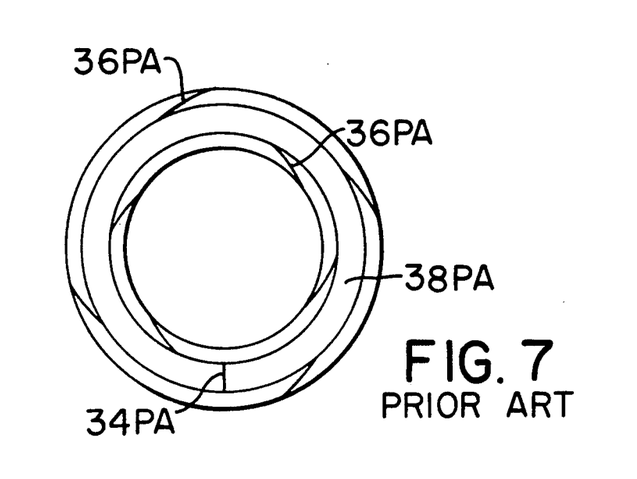
FIG. 7 represents a prior art film wherein only the VDC copolymer layer has a weld line with an angle of greater then 45 degrees with respect to the surfaces of that respective layer.

A significant feature of the films of this invention is the weld line 34 shown in FIGS. 6 and 8. It is normal for VDC copolymers to exhibit a weld line through the VDC copolymer layer, as seen in FIG. 7, as a result of having been coextruded through a crosshead type mandrel. The weld line typically is formed at a location 180 degrees around the circumference of mandrel from the location where the stream entered the mandrel. The weld line approaches the layer surfaces at a minimum angle of at least 45 degrees, typically about 90 degrees. With respect to FIG. 2, and the films of the invention, the entrance to the mandrel is associated with the adapting zone 26, and so the weld line in the film is associated with the left side of the mandrel as seen in FIG. 2.

The weld line 34 in films of the invention approaches each of the layer surfaces at a minimum angle of at least 45 degrees, typically about 90 degrees, as shown in FIG. 6. The term "minimum angle" is defined as that smallest measurable angle between the weld line and the respective surface, adjacent that respective surface.

In a typical film of the prior art seen in FIG. 7, only the VDC copolymer layer has been processed through a crosshead type mandrel. The inner and outer layers in prior art structures have typically been processed through a different type of mandrel, such as a spiral mandrel, which does not create a weld line at a minimum angle of at least 45 degrees, especially a perpendicular angle to the surfaces of the film. Rather, the spiral type mandrel provides weld lines which approach the surfaces of the related layers at angles substantially less than 45 degrees to those surfaces. Typical spiral weld lines, formed through a spiral mandrel, are seen at 36PA in FIG. 7. As seen in FIG. 7, only the VDC copolymer layer 38PA exhibits the weld line having an angle greater than 45 degrees to the surfaces of the associate layer 38PA. In some embodiments, not shown, the weld line 38PA diverges from the essentially perpendicular angle shown, but it is nevertheless greater than 45 degrees as measured from the surfaces of the related layer. Referring to spiral weld lines 36PA as seen in FIG. 7, those weld lines approach the surfaces of the related layers at angles of less than 45 degrees. FIGS. 7 and 8 are film cross-sections. They do not have the normal cross-section hatching, as that would obscure the spiral weld lines 36PA, 44 and 46.

A typical film of the invention, and represented by FIG. 6, is of the order of 0.05 mm. to 0.10 mm. thick. Films as thin as 0.03 mm. are contemplated, and films up to about 0.5 mm. are commonly extruded by the tubular process. Thicker films may also be fabricated, but are generally less preferred.

Referring now to FIG. 8, the basic 3 layer structure 32 as seen in FIG. 6, is represented with further fourth and fifth layers 40 and 42 combined with 3 layers A, B, A, of the structure 32. The 5 layer structure seen in FIG. 8 is preferably fabricated by a coextrusion or extrusion coating process. Indeed, the 3 layer combination 32, which is fabricated by the use of the crosshead mandrel 11 in combination with the feedblock 20, may readily be combined in an otherwise conventional die with one or more other layers in fabrication of a tube having more than the 3 layers which are illustrated as being fabricated by mandrel 11. It is specifically noted in FIG. 8 that weld line 34 extends through the 3 layer substructure A/B/A at an angle essentially perpendicular to the surfaces of the respective layers, and does not extend through layers 40 and 42. Rather, layers 40 and 42 are represented as having spiral weld lines 44 and 46, which approach the associated surfaces of their respective layers at angles substantially less than 45 degrees.

Where layers 40 and 42 are coextruded with the A/B/A structure, mandrel 10 as seen in FIG. 2 will desirably have second and third orifices located inwardly and outwardly of orifice 31 for fabrication of layers 42 and 40 respectively. In such case, the outer surface of containing wall 19 could form the inner surface of the outer orifice, and could accordingly include therein spiral grooves such as are associated with spiral mandrels.

Within the definition of this invention, it is acceptable for layers 40 and 42 to have weld lines approaching the respective layer surfaces at angles greater than 45 degrees so long as those weld lines are displaced angularly from the weld line 34.

Figure 9:
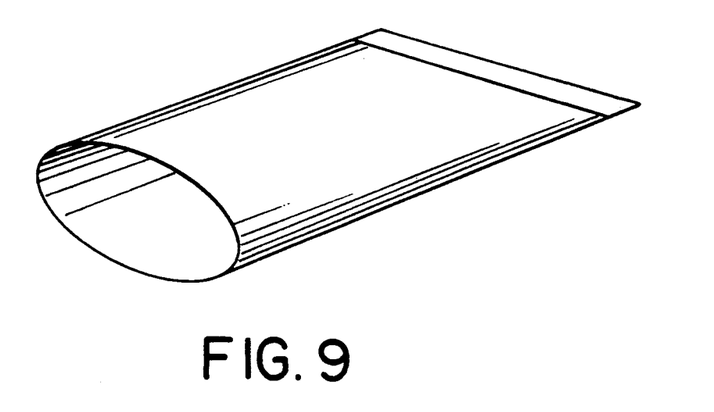
FIG. 9 shows a pictorial view of a typical pouch type package made with films of the invention.

The films of the invention are susceptible to being fabricated into packages according to conventional practice used for otherwise conventional films containing VDC copolymer, or other polymers as herein disclosed. Typical of such packages is pouch 48 which may be fabricated by forming a seal 50 at one end of a length of the tube structure fabricated by a film-forming method of the invention.

It is seen that the apparatus and methods of the invention have been disclosed with respect to the advantages gained in their use in fabricating films containing one or more layers of VDC copolymer. The processes and apparatus are also advantageously used as a means of combining a plurality of polymer compositions ahead of an annular die. Advantageously, the feedblock 20 can be used as a means of fabricating, for example, a 3 layer polymer flow stream as at 24, which is used in conjunction with a single mandrel as at 11, in fabrication of a 3 layer structure in tubular form. An advantage of this process, even without using VDC copolymer in the composition of the film, is the ability to fabricate a 3 layer structure in a single tubular channel 13 of a tubular die, illustrated in part at 10 in FIG. 2. To the extent the die is capable of combining additional layers with the structure fabricated in the crosshead mandrel 11, a 3 layer die, for example, may be used in fabrication of a 5 layer film.

As illustration of a more simple embodiment of the invention, a 2-layer tubular film may be fabricated with a single layer die by combining two compositions in a 2-layer feedblock and passing them through the corresponding mandrel 11, to form a 2-layer substructure. While such a practice will not provide the "A"-layer shielding function described above for a VDC copolymer layer, such a practice is entirely satisfactory where layer shielding is not an issue, such as in a structure devoid of VDC copolymer.

Broadly speaking, then, the invention provides the capability to fabricate a tubular film in a coextrusion die and wherein the film extruded from the die contains more layers than there are annular openings in the die, with each layer extending the full circumference of the film tube. The ability to join the edges of the individual layers at the weld line is a function of each of the layers extending to the edge surfaces of the polymer stream fabricated from the exit stream; each layer extending to the edges 25 of the exit stream being illustrated in FIG.

3. Absent that ability, and as occurs with total encapsulation, the weld line contains only the outer "A" layers. To the extent the "B" layer is required for the proper functioning of the film, such tubularly fabricated films are deficient in performance. Once the film is formed, such deficiency can only be rectified by opening the tube along the weld line and removing the strip which is devoid of "B"-layer material. While the tube may again be reformed, as by a longitudinal joint or seam, after removing the offending strip, such processes are less economical than use of a directly fabricated film having acceptable properties at the time it is tubularly fabricated. Further, such a reformed tube may be deficient in certain measures of strength, and may be less desirable in appearance than a tube having no such seam or joint.

Since conventional coextrusion feedblocks are readily available, and are fairly economical, as compared to a separate tubular die for fabrication of the same number of layers, the method of the invention provides an economical way to upgrade a 3 layer die for fabrication of a 5 layer film. It also provides the capability, with only the inclusion or exclusion of the feedblock, to use the same equipment for fabrication of both 3 layer films and 5 layer films.

It is known that conventional feedblocks may fabricate exit streams having more than 3 layers. Similarly, the feedblocks used in the invention herein may be selected/designed to fabricate a conventionally desired number of layers into the exit stream 24 for feeding to the crosshead mandrel 11. Thus the feedblock could fabricate 5 layers, for example, or 7 layers, or more. The difficulty of controlling the number of layers, of course, increases conventionally with respect of the number of layers being fabricated.

A specific use contemplated for the methods and apparatus of the invention is the positioning of adhesive layers A on either side of a core layer B for fabrication into a 3 layer structure as in crosshead mandrel 11 and wherein inner and outer fourth and fifth layers are positioned on either side of the adhesive layers in a typical 3 layer die. With respect to structures using VDC copolymer, and wherein the adhesive material is an ethylene vinyl acetate (EVA) a structure of the following nature may typically be fabricated.

LLDPE/EVA/VDC-CP/EVA/LLDPE

LLDPE=Linear low density polyethylene copolymer.
In the above structure the VDC-CP typically comprises 10%–40% of a film which is 0.05–0.10 mm. thick. The EVA layers typically comprise 5–10% of the thickness. The balance of the thickness may be distributed between the 2 LLDPE layers as desired.

Where the barrier material selected for layer "B" is ethylene vinyl alcohol copolymer (EVOH), the structural equivalent of the above VDC structure is

LLDPE/ADH/EVOH/ADH/LLDPE.

ADH=Adhesive.
Adhesives usedful in the fabrication of EVOH films are conventionally known. Typical of these are the Plexars from Chemplex Co., the Admers from Mitsui Petrochemical, and the Bynels from DuPont.

By way of example of a similar 7-layer film which may be fabricated, with the 5 interior layers having been preformed into a 5-layer exit stream in the feedblock as at 20, there is seen the structure LLDPE/EVA/adh/EVOH/adh/EVA/LLDPE.

Other structures and compositions, and combinations thereof, will now be obvious to those skilled in the art; as the invention is susceptible to a variety of specific adaptations of the apparatus, the methods and the produced film structures.

The films fabricated in tubular form according to the invention may, for example, be subjected to subsequent extrusion processing steps and additional film converting processes which are common to the art. Exemplary of the extrusion processing step is extrusion coating and coextrusion coating of tubular films as is well known. Exemplary of additional converting process steps are the steps of irradiating the films, heat setting the films, and the like.

With respect to the outer forth and fifth layers disclosed above, there may be any number of materials substituted for the LLDPE. Typical of such polymers are polypropylene homopolymers and copolymers, polyethylenes including low density, medium density, and high density, polyethylenes and ethylene copolymers including EVA, ionomers, and vinyl alcohol copolymers such as EVOH. The above listing is only exemplary in that the invention may extend to any material which can be coextruded with any other material in a typical extrusion operation.

The apparatus and methods of the invention are generally such that the several layers passing through feedblock 20, conduit 22, and mandrel 11 are in contact with each other at the associated elevated temperatures for a greater length of time than is normal in some conventional coextrusion processes. This greater length of time is seen as being instrumental in the advantageous development of additional bonding strength between the related layers at their corresponding interfaces.

With respect to extrusion of VDC copolymer, the reduction in the surface area of contact between the VDC-copolymer and the die, as illustrated in FIG. 5, reduces the amount of catalysis occurring at the common interface between VDC-copolymer and the die surfaces. Thus the rate of degradation of VDC copolymer is reduced. Likewise, the associated build-up of carbon in the die is attenuated. Accordingly, using this invention, VDC copolymer extrusion processes can be operated continuously, in normal specification ranges, for extended periods of time between shut-downs for die cleaning. Typical time periods run at least 2 weeks, and are contemplated to run at least a month, and perhaps as long as conventional non-VDC-copolymer extrusions.

While the invention has been disclosed with respect to the advantages of using the apparatus and processes of the invention with films containing a layer of about 100% VDC copolymer, layers containing a blend of, for example, as little as at least 25%, expecially at least 50%, VDC copolymer will exhibit problems of degradation and carbon formation, similar to those discussed herein, absent the use of the principles of the invention disclosed herein. Thus those films containing at least 25% VDC copolymer in one or more layers, can benefit from the shielding of a respective layer from contact with die surfaces as in the invention herein. Accordingly, compositions containing at least 25%, preferably at least 50%, VDC copolymer, in one or more layers, are included within the meaning of the term "VDC copolymer" as used herein.

In addition to its applicability with respect to films, this invention can also be used in fabrication of tubes and bottles, as packages. In fabrication of tubes, the extrudate may generally be extruded in the form of a continuous tube having the desired cross-section of layers in essentially the desired thicknesses. Generally the thicknesses of such tubes is about 0.30 mm. to about 0.61 mm., preferably about 0.40 mm. to about 0.46 mm.

In fabrication of bottles, a tubular parison is first extruded having a thickness of about 0.76 mm. to about 5 mm., typically about 2.3 mm. The sidewall thickness of bottles then blown from such a parison is typically about 0.40 mm. to about 1.3 mm., commonly about 0.8 mm.

While the invention has been described above with respect to its preferred embodiments, it will be understood that the invention is capable of numerous rearrangements, modifications, and alterations, and all such arrangements, modifications, and alterations are intended to be within the scope of the appended claims.

Having thus described the invention, what is claimed is:

1. A tubular film comprising at least one layer comprising at least 25% wt. % vinylidene chloride copolymer and a second layer on one opposing surface of the first layer, a longitudinal weld line extending sequentially through said layers in a continuous path at an angle greater than 45 degrees to the surface of the first layer, said film being molecularly unoriented beyond that orientation which is sustained in a film-forming extrusion process, and having a circumference of at least 200 centimeters.

2. A tubular film as in claim 1 having a circumference of greater than 215 centimeters.

3. A tubular film as in claim 1 having a circumference of between 215 centimeters and 250 centimeters.

4. A tubular film as in claim 1 having a circumference between 215 centimeters and 350 centimeters.

5. A film comprising at least one layer comprising at least 25 wt. % vinylidene chloride copolymer, said film having been fabricated using a tubular extrusion process in which said film, as extruded and quenched from said extrusion process, having a circumference of at least 200 centimeters.

6. A film as in claim 5 having a circumference of greater than 215 centimeters.

7. A film as in claim 5 having a circumference between 215 centimeters and 250 centimeters.

8. A film as in claim 5 having a circumference between 215 centimeters and 350 centimeters.

* * * * *